United States Patent
Hong et al.

(10) Patent No.: US 12,390,781 B2
(45) Date of Patent: Aug. 19, 2025

(54) SYSTEMS AND METHODS FOR HYDROCARBON PYROLYSIS

(71) Applicant: Palo Alto Research Center Incorporated, Palo Alto, CA (US)

(72) Inventors: Jin Ki Hong, Cypress, CA (US); Bradley Rupp, San Francisco, CA (US); Mary W. Louie, Menlo Park, CA (US); Dane Andrew Boysen, Spokane, WA (US); Jessica de Paula Tadeu Medrado, San Jose, CA (US)

(73) Assignee: Xerox Corporation, Norwalk, CT (US)

( * ) Notice: Subject to any disclaimer, the term of this patent is extended or adjusted under 35 U.S.C. 154(b) by 553 days.

(21) Appl. No.: 17/932,346

(22) Filed: Sep. 15, 2022

(65) Prior Publication Data
US 2024/0091727 A1    Mar. 21, 2024

(51) Int. Cl.
*B01J 6/00* (2006.01)
*B01J 19/00* (2006.01)

(52) U.S. Cl.
CPC .......... *B01J 6/008* (2013.01); *B01J 19/0013* (2013.01); *B01J 19/0053* (2013.01); *B01J 2204/005* (2013.01); *B01J 2219/00123* (2013.01); *B01J 2219/00231* (2013.01)

(58) Field of Classification Search
CPC .... B01J 19/0013; B01J 6/008; B01J 19/0053; B01J 2204/005
See application file for complete search history.

(56) References Cited

U.S. PATENT DOCUMENTS

| | | | | |
|---|---|---|---|---|
| 1,418,385 | A * | 6/1922 | Masson | C09C 1/54 196/118 |
| 1,756,877 | A * | 4/1930 | Paris, Jr. | C09C 1/48 423/458 |
| 1,926,563 | A * | 9/1933 | Seifer | C10G 9/40 208/125 |
| 2,760,847 | A * | 8/1956 | Boedeker | C09C 1/54 422/150 |
| 10,851,307 | B2 | 12/2020 | Desai et al. | |
| 2017/0217772 | A1* | 8/2017 | Stiller | B01J 27/22 |
| 2019/0055173 | A1* | 2/2019 | Desai | C22C 38/00 |
| 2020/0002165 | A1 | 1/2020 | Desai et al. | |
| 2020/0283293 | A1 | 9/2020 | McFarland et al. | |
| 2021/0061654 | A1* | 3/2021 | McFarland | B01J 35/27 |
| 2021/0062279 | A1 | 3/2021 | Desai et al. | |

(Continued)

*Primary Examiner* — Matthew J Merkling
(74) *Attorney, Agent, or Firm* — Bell & Manning, LLC (57) ABSTRACT

Systems for hydrocarbon pyrolysis are provided, which may comprise a reactor configured to contain a liquid metal; a heater operably coupled to the reactor to form a heating zone; a cooler operably coupled to the reactor to form a cooling zone; a gas delivery assembly comprising an inlet and configured to deliver a feed gas comprising a hydrocarbon as a plurality of bubbles through the liquid metal; an outlet configured to deliver a product gas to a separation assembly, the product gas formed from pyrolysis of the hydrocarbon in the liquid metal, the product gas comprising $H_2$ and carbon; and the separation assembly configured to separate the carbon from other components of the product gas. The reactor is configured to entrain the carbon from pyrolysis of the hydrocarbon in the liquid metal into the product gas without accumulating the carbon in the interior chamber during pyrolysis.

13 Claims, 5 Drawing Sheets

(56) References Cited

U.S. PATENT DOCUMENTS

2021/0170352 A1   6/2021  Rivest et al.
2021/0170387 A1   6/2021  Rivest et al.
2023/0099516 A1*  3/2023  Shaner .................... C01B 32/00
                                                        48/127.9

* cited by examiner

SYSTEMS AND METHODS FOR HYDROCARBON PYROLYSIS

BACKGROUND

The pyrolytic conversion of methane to hydrogen and carbon (i.e., $CH_4$ (g)→$2H_2$ (g)+C (s)) has the potential to provide an emission-free process for the production of hydrogen from a greenhouse gas. However, numerous challenges have hindered the commercial implementation of this process. For example, systems for non-catalytic methane pyrolysis require extreme operating temperatures. Solid metal catalysts may be used to allow for reduced operating temperatures but suffer from rapid carbon buildup (coking). Liquid metals and alloys facilitate thermal energy transfer needed for endothermic pyrolysis reaction and promote pyrolysis reaction rate, but separation of the carbon from the liquid metal/alloy remains a significant and unsolved problem.

SUMMARY

The present disclosure provides a hydrocarbon pyrolysis system configured to entrain solid carbon in a product gas produced from pyrolysis of a hydrocarbon in a liquid metal. Embodiments of the present systems achieve carbon entrainment in the product gas without accumulating carbon within a reactor of the system during pyrolysis. This allows for the continuous, uninterrupted production of hydrogen from the hydrocarbon, thereby increasing efficiency and reducing costs.

In one aspect, systems for hydrocarbon pyrolysis are provided. In embodiments, a system for hydrocarbon pyrolysis comprises a reactor configured to contain a liquid metal within an interior chamber of the reactor; a heater operably coupled to the reactor to form a heating zone within a first portion of the interior chamber comprising the liquid metal; a cooler operably coupled to the reactor to form a cooling zone within a second portion of the interior chamber above the first portion; a gas delivery assembly comprising an inlet in fluid communication with the interior chamber, the gas delivery assembly configured to deliver a feed gas comprising a hydrocarbon as a plurality of bubbles through the liquid metal; an outlet in fluid communication with the interior chamber and configured to deliver a product gas to a separation assembly, the product gas formed from pyrolysis of the hydrocarbon in the liquid metal, the product gas comprising $H_2$ and carbon; and the separation assembly in fluid communication with the interior chamber via the outlet, the separation assembly configured to separate the carbon from other components of the product gas. The reactor is configured to entrain the carbon from pyrolysis of the hydrocarbon in the liquid metal into the product gas without accumulating the carbon in the interior chamber during pyrolysis.

In embodiments, a system for hydrocarbon pyrolysis comprises a reactor configured to contain a liquid metal within an interior chamber of the reactor; a heater operably coupled to the reactor to form a heating zone within a first portion of the interior chamber comprising the liquid metal; a cooler operably coupled to the reactor to form a cooling zone within a second portion of the interior chamber above the first portion; a gas delivery assembly comprising an inlet in fluid communication with the interior chamber, the gas delivery assembly configured to deliver a feed gas comprising a hydrocarbon as a plurality of bubbles through the liquid metal; an outlet in fluid communication with the interior chamber and configured to deliver a product gas to a separation assembly, the product gas formed from pyrolysis of the hydrocarbon in the liquid metal, the product gas comprising $H_2$ and carbon; and the separation assembly in fluid communication with the interior chamber via the outlet, the separation assembly configured to separate the carbon from other components of the product gas. The system does not comprise any other outlet through which carbon exits the interior chamber other than the outlet configured to deliver the product gas to the separation assembly.

In embodiments, a system for hydrocarbon pyrolysis comprises a reactor configured to contain a liquid metal within an interior chamber of the reactor; a heater operably coupled to the reactor to form a heating zone within a first portion of the interior chamber comprising the liquid metal; a cooler operably coupled to the reactor to form a cooling zone within a second portion of the interior chamber above the first portion; a gas delivery assembly comprising an inlet in fluid communication with the interior chamber, the gas delivery assembly configured to deliver a feed gas comprising a hydrocarbon as a plurality of bubbles through the liquid metal; an outlet in fluid communication with the interior chamber and configured to deliver a product gas to a separation assembly, the product gas formed from pyrolysis of the hydrocarbon in the liquid metal, the product gas comprising $H_2$ and carbon; the separation assembly in fluid communication with the interior chamber via the outlet, the separation assembly configured to separate the carbon from other components of the product gas; and a controller comprising a processor and a non-transitory computer-readable medium operably coupled to the processor, the non-transitory computer-readable medium comprising instructions, that, when executed by the processor, cause the system to adjust one or more of a feed gas flow rate, a reactor temperature, and a reactor pressure to achieve a linear gas velocity of at least about 5 cm/s through the interior chamber.

In another aspect, processes for hydrocarbon pyrolysis are provided. In embodiments, a process for hydrocarbon pyrolysis comprises delivering a feed gas comprising a hydrocarbon to a reactor configured to contain a liquid metal within an interior chamber of the reactor under conditions to induce pyrolysis of the hydrocarbon in the liquid metal to form a product gas comprising $H_2$ and carbon. The feed gas is delivered at a linear gas velocity through the interior chamber such that the carbon is entrained into the product gas without accumulating the carbon in the interior chamber during pyrolysis.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

DETAILED DESCRIPTION

Figure 1:
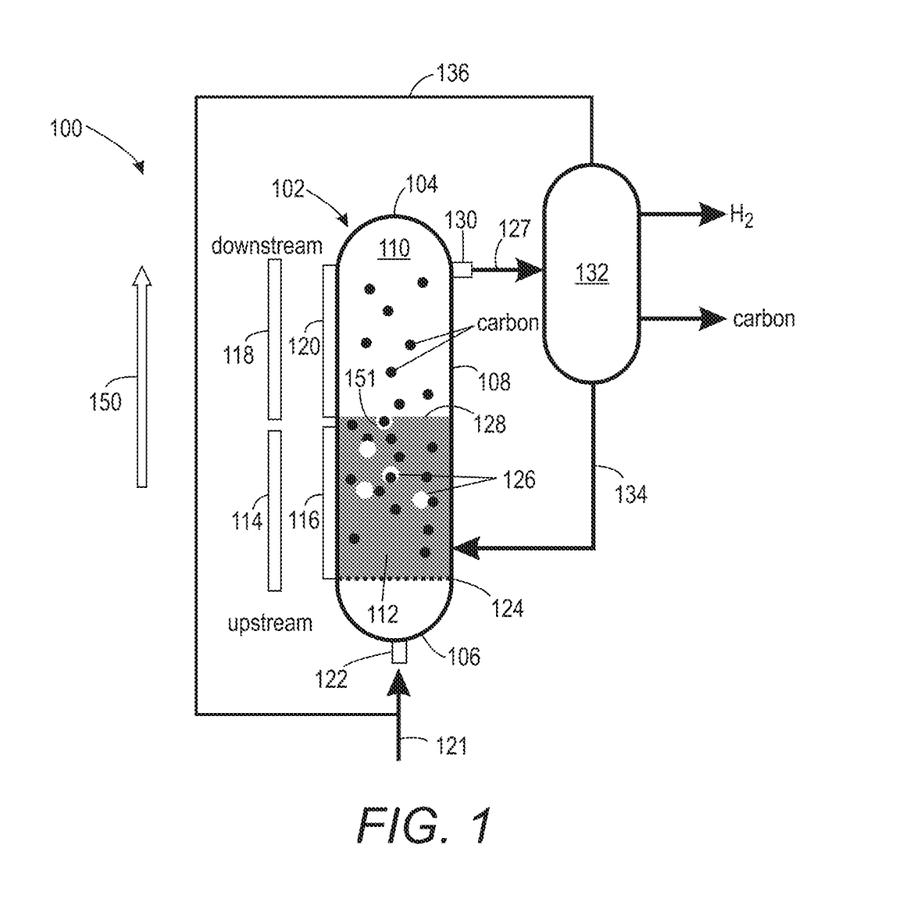
FIG. 1 shows a cross-sectional view of a schematic illustration of a hydrocarbon pyrolysis system according to an illustrative embodiment.

Systems for carrying out hydrocarbon pyrolysis in liquid metal are provided. In the present disclosure, "hydrocarbon pyrolysis" refers to breaking down a hydrocarbon into H$_2$ and carbon (e.g., CH$_4$ (g)→2H$_2$ (g)+C (s)) using an elevated temperature, a catalyst, or both. A cross-sectional view of a schematic of an illustrative system 100 is shown in FIG. 1. The system 100 comprises a reactor 102, the component within which the relevant chemical reactions take place. The reactor 102 is in the form of a cylindrical column having a top end 104, a bottom end 106 opposite the top end 104, and a side wall 108 between the top 104 and bottom 106 ends, together which define an interior chamber 110 which may be partially filled with a liquid metal 112. (Under the operating conditions of the system 100, the metal 112 is in its liquid form, but it is understood that outside of such operating conditions, the metal 112 may be in its solid form or its gaseous form. Both the terms "liquid" and "molten" may be used to refer to a metal in its liquid phase. Thus, "liquid metal" and "molten metal" may be used interchangeably.) A heater 114 is operably coupled to a portion of the reactor 102 so as to form a heating zone 116 within the interior chamber 110. A cooler 118 is operably coupled to another, different portion of the reactor 102 so as to form a cooling zone 120 within the interior chamber 110. Generally, the heating zone 116 encompasses the volume of the liquid metal 112 within the interior chamber 110 while the cooling zone 120 encompasses the atmosphere within the interior chamber 110 above the liquid metal 112.

A feed gas 121 enters the reactor 102 through an inlet 122 positioned at or near the bottom end 106 of the reactor 102. The inlet 122 is fluidly connected to one or more spargers (or the like) 124 configured to deliver the feed gas 121 to the liquid metal 112 as a plurality of bubbles 126. The inlet 122 and the spargers (or the like) may be part of a gas delivery system operably coupled to the reactor 102. The feed gas 121 comprises the desired hydrocarbon (e.g., methane). Decomposition of the hydrocarbon to produce H$_2$ and carbon via pyrolysis occurs as the bubbles 126 travel through the liquid metal 112, generally upwardly toward an interface 128 formed between the liquid metal 112 and the overlying atmosphere in the cooling zone 120. The upward flow of bubbles through the liquid metal 112 in the reactor 102 distinguishes the system 100 from other types of reactors, e.g., liquid mist reactors; i.e., reactor 102 is not a liquid mist reactor. Pyrolysis occurring in the liquid metal 112 results in a product gas 127 being released from the interface 128 and into the atmosphere of the cooling zone 120. This is illustrated schematically in FIG. 1 with the bursting bubble 151 about to release carbon from within the bursting bubble. The flow of the bubbles 126 and the product gas 127 is indicated by the arrow 150 in FIG. 1. The arrow 150 also provides a reference point for upstream and downstream positions in the system 100, as labeled in FIG. 1. The product gas 127 comprises the H$_2$ gas, carbon, and generally, at least some unreacted hydrocarbon. Some metal of the liquid metal 112 may also be present in the product gas 127, either as metal vapor, or as liquid droplets or solid adsorbed on surfaces of the carbon, or both.

The product gas 127 exits the reactor 102 through an outlet 130 positioned at or near the top end 104 of the reactor 102. At least some heat is removed from the product gas 127 as it travels through the cooling zone 120 prior to exiting through the outlet 130. In embodiments, sufficient heat is removed so that metal vapor that may be present in the product gas 127 condenses and flows back down into the heating zone 116 of the reactor 102 and to the liquid metal 112 therein. This temperature drop in the product gas 127 in the cooling zone 120 leads to a decrease in metal vapor pressure and an increase in the amount of metal vapor condensed and returned to the liquid metal 112.

The system 100 further includes a separation assembly 132 in fluid communication with the reactor 102 via the outlet 130. The separation assembly 132 is configured to separate individual components of the product gas 127 from one another, e.g., to separate out the H$_2$ from the product gas 127 and to separate out the carbon from the product gas 127. In embodiments, such as in the system 100, the separation assembly 132 is also configured to separate out liquid/solid metal that may be present in the product gas 127 and return it to the reactor 102 via a first recirculation path 134. However, other embodiments need not include this feature or the first recirculation path 134, i.e., it is optional. In embodiments, such as in the system 100, the separation assembly 132 is also configured to separate out unreacted hydrocarbon that may be present in the product gas 127 and return it to the reactor 102 via a second recirculation path 136. The separation assembly 132 may include components configured to achieve the separations described above, e.g., filters, pressure swing adsorption units, gravimetric separators, cyclone separators, electrostatic separators, and evaporation units.

Other components may be included in system 100. One or more pressure gauges may be included to measure the pressure in the reactor 102. For example, the system 100 may include a downstream pressure gauge positioned at a downstream position relative to the inlet 122, e.g., at or near the outlet 130. The downstream pressure gauge may be used to measure the pressure of the product gas 127. The system 100 may include an upstream pressure gauge positioned at an upstream position, e.g., at or near the inlet 122. The upstream pressure gauge may be used to measure the pressure of the feed gas 121. As further described below, the pressure of the feed gas 121 (e.g., as measured from an upstream pressure gauge) may be used to provide an indication of carbon accumulation within the reactor 102. Specifically, an increase in upstream pressure indicates carbon accumulation and no change in upstream pressure indicates no increase in carbon accumulation. Similarly, one or more temperature sensors may be included in the system 100. One or more gas flow controllers may be included in the system 100 e.g., to provide a desired flow rate of the feed gas 121.

Referring back to the reactor 102, the reactor 102 may be configured to achieve a linear gas velocity through interior chamber 110 of the reactor 102 that prevents carbon accumulation therein, including so that no carbon accumulates within the reactor. The phrase "linear gas velocity" may be referred to as "superficial gas velocity." Although some existing pyrolysis systems have considered carbon entrainment, the present disclosure is based, in part, on the unexpected discovery that linear gas velocity can be tuned to prevent carbon accumulation altogether, including so that no carbon accumulates within the reactor. By contrast, existing pyrolysis systems do not preclude carbon accumulation, including carbon accumulating in the form of a layer or slag at the interface 128. Thus, existing pyrolysis systems require additional components to remove carbon, such as scrapers or the like to mechanically remove the carbon (and generally some of the liquid metal) from the reactor, as well as an additional outlet to remove the carbon.

As noted above, carbon accumulation within the reactor 102 may be indicated by measuring an upstream pressure (e.g., from an upstream pressure gauge measuring the pressure of the feed gas 121) and a downstream pressure (e.g., from a downstream pressure gauge measuring the pressure of the product gas 127). An increase in upstream pressure with no change in downstream pressure during operation (i.e., during pyrolysis) of the reactor 102 is an indication of carbon accumulation. (See FIG. 3.) By contrast, no change in upstream pressure and no change in downstream pressure during operation of the reactor 102 is an indication of no carbon accumulation. (See FIG. 4.) By "no change" it is meant that the pressure during operation (as feed gas 121 is flowing through the reactor 102) is within 10% of an initial pressure (time=0). This includes within 5%, within 2%, and within 1%. By way of illustration, if an initial upstream pressure at time=0 is 30 psig, no change in upstream pressure during reactor operation means that the upstream pressure remains within 10% (or 5%, 2%, 1%) of 30 psig during reactor operation. Similarly, if an initial downstream pressure at time=0 is 30 psig, no change in downstream pressure during reactor operation means that the downstream pressure remains within 10% (or 5%, 2%, 1%) of 30 psig during reactor operation. Thus, upstream pressures and downstream pressures that each remain within 10% (or 5%, 2%, 1%) of their respective values during pyrolysis indicate that the carbon is being entrained into the product gas without accumulating the carbon within the reactor 102.

The linear gas velocity through the reactor 102 may be calculated from Equation 1 (see also, the Example, below):

$$\frac{F(cm^3/s)}{A(cm^2)} * \left(\frac{T_{reactor}(K)}{P_{reactor}(psia)} * \frac{P_{standard}(psia)}{T_{standard}(K)}\right) \quad \text{(Equation 1)}$$

wherein F is the feed gas flow rate in cm$^3$/s at standard temperature and pressure, A is the reactor cross-sectional area, $T_{reactor}$ is the reactor temperature, $P_{reactor}$ is the reactor pressure, $P_{standard}$ is standard pressure (14.7 psia), and $T_{standard}$ is standard temperature (273.15 K). Thus, the linear gas velocity depends upon the reactor geometry (cross-sectional area A of the interior chamber 110) and reactor conditions (feed gas flow rate, reactor temperature, reactor pressure).

In embodiments, the reactor 102 is configured to achieve a linear gas velocity of at least 5 cm/s at a feed gas flow rate of 300 sccm (standard cubic centimeter per second) or higher (including a feed gas flow rate of 300 sccm), a reactor temperature of 1,000° C., and a reactor pressure of 147 psia. This includes achieving a linear gas velocity of at least 10 cm/s or at least 25 cm/s at this feed gas flow rate, this reactor temperature, and this reactor pressure. This means that at a reactor temperature of 1,000° C., a reactor pressure of 147 psia, and a feed gas flow rate of 300 sccm or higher (including a feed gas flow rate of 300 sccm), the linear gas velocity of the reactor 102 is 5 cm/s or higher (or 10 cm/s or higher or 25 cm/s or higher). In embodiments, the reactor 102 is configured to achieve a linear gas velocity of no more than 100 cm/s at a feed gas flow rate of 2,000,000 sccm or lower (including a feed gas flow rate of 2,00,000 sccm), a reactor temperature of 1,000° C., and a reactor pressure of 147 psia. This includes achieving a linear gas velocity of no more than 80 cm/s or no more than 50 cm/s at this feed gas flow rate, this reactor temperature, and this reactor pressure. This means that at a reactor temperature of 1,000° C., a reactor pressure of 147 psia, and a feed gas flow rate of 2,000,000 sccm or lower (including a feed gas flow rate of 2,000,000 sccm), the linear gas velocity of the reactor 102 is 100 cm/s or less (or 80 cm/or less or 50 cm/s or less). In embodiments, at a reactor temperature of 1,000° C., a reactor pressure of 147 psia, and a flow rate of between 300 sccm and 2,000,000 sccm, the linear gas velocity of the reactor 102 is between 5 cm/s and 100 cm/s (or between 10 cm/s and 80 cm/s or between 25 cm/s and 50 cm/s). Reactors configured to achieve these linear gas velocities at these feed gas flow rates, reactor temperatures, and reactor pressures (and thus, reactors configured to achieve carbon entrainment without accumulating carbon) may be obtained by using an appropriate minimum cross-sectional area A for the reactor 102. As further described below, during operation of the reactor 102 (or any given reactor), adjustments may be made to feed gas flow rate, reactor temperature, reactor pressure, or combinations thereof, to ensure these linear gas velocities are met.

Referring back to FIG. 1, it is noted that the system 100 does not comprise any other inlet other than inlet 122. In embodiments, the present systems need not comprise any other inlet through which a gas enters the reactor other than an inlet (e.g., inlet 122) configured to deliver a feed gas to the reactor. However, in embodiments, the system 100 further comprises a carrier gas inlet configured to deliver a carrier gas to the cooling zone 120 of the reactor 102. The carrier gas inlet may be positioned along a side wall 108 within the cooling zone 120. Delivery of the carrier gas in this way is useful to further reduce the temperature in the cooling zone 120 and promote condensation of metal vapor that may be present in the product gas 127 and its return to the liquid metal 112 in the heating zone 116. The carrier gas may comprise methane, hydrogen, and nitrogen. In embodiments, the present systems do not comprise any other inlet other than inlet 122 and optionally, a carrier gas inlet.

It is further noted that the system 100 does not comprise any other outlet other than outlet 130. In embodiments, the present systems need not comprise any other outlet through which carbon exits the reactor other than an outlet (e.g., outlet 130) configured to deliver a product gas to a separation assembly (e.g., separation assembly 132). The system 100 does not comprise components for physically removing carbon from the interface 128 (other than the product gas flow-driven carbon entrainment described herein). These features are all because the system 100 is able to achieve carbon entrainment in the product gas 127 with no carbon accumulation within the reactor 102.

Various metals may be used to provide a liquid metal for use with any of the present systems, including system 100.

A single type (i.e., a single element) of metal may be used, or a combination of different types of metals (i.e., a metal alloy which is a combination of different elements) may be used. Thus, unless otherwise indicated, "metal" encompasses "metal alloy." In embodiments, the metal is one having a relatively low boiling point, e.g., no more than 1200° C. Illustrative metals include zinc, gallium, tin, aluminum, lead, bismuth, tellurium, and copper. In embodiments, the liquid metal comprises or consists of zinc. In embodiments, the liquid metal does not comprise a molten salt and does not comprise a solid metal catalyst. In embodiments, the liquid metal consists of a single liquid phase, i.e., as opposed to multiple liquid phases. In embodiments, the liquid metal consists of a single type of metal.

Various hydrocarbons may be used in a feed gas being processed by any of the present systems, including system 100. A single type (i.e., a single chemical compound) of hydrocarbon may be used in the feed gas, or a mixture of different types (i.e., different chemical compounds) of hydrocarbons may be used. In embodiments, the hydrocarbon (hydrocarbon mixture) is one having a relatively low boiling point, e.g., no more than 500° C., no more than 400° C., or no more than 300° C. Otherwise, the hydrocarbon is not particularly limited, but may be an alkane, an alkene, an alkyne, or an arene. The hydrocarbon may be linear, branched, or cyclic. Illustrative hydrocarbons include methane, propane, butane, pentane, hexane, benzene, xylene, and toluene. Illustrative hydrocarbon mixtures include natural gas, liquified petroleum gas, gasoline, diesel, kerosene, naphtha, and jet fuel (e.g., JP-8). These hydrocarbons and hydrocarbon mixtures may be used alone or in any combination. In embodiments, the hydrocarbon is methane or natural gas (hydrocarbon mixture).

The carbon produced by any of the present systems, including system 100, refers to carbon in its solid form. However, the particular solid form is not limited, but may be carbon black, carbon fiber, carbon nanofiber, carbon nanotube, carbon nanocage, fullerene, graphite, amorphous carbon, coke, needle coke, or diamond. The carbon may include one or more of these solid forms.

The conditions under which the pyrolysis is carried out using any of the present systems, including system 100, include parameters such as linear gas velocity, flow rate of a feed gas, reactor temperature, and reactor pressure. Referring to system 100, as described above, the linear gas velocity is generally selected to prevent carbon accumulation within the reactor 102, including so that no carbon accumulates within the reactor 102. (The indication of carbon accumulation has been described above.) This can include increasing the flow rate of the feed gas 121 for a selected cross-sectional area A of the reactor 102, a selected reactor temperature and a selected reactor pressure. However, adjustments to one or more of the flow rate of the feed gas 121, the reactor temperature, and the reactor pressure may be made to prevent carbon accumulation, including so that no carbon accumulates within the reactor. Illustrative linear gas velocities include those in a range of from 5 cm/s to 100 cm/s, from 10 cm/s to 80 cm/s, and from 25 cm/s to 60 cm/s. Illustrative feed gas 121 flow rates include those in a range of from 300 sccm to 2,000,000 sccm, from 1000 sccm to 1,000,000 sccm, from 5,000 sccm to 500,000 sccm, and from 10,000 sccm to 100,000 sccm. The reactor temperature may refer to the temperature of a heating zone, e.g., the heating zone 116 of the system 100, which may be, e.g., in a range of from 500° C. to 1500° C., from 600° C. to 1400° C., or from 700° C. to 1300° C. (The reactor temperature/temperature of the heating zone may be considered to be the temperature of a liquid metal in the heating zone, e.g., the liquid metal 112.) The reactor pressure may refer to either the upstream pressure or the downstream pressure as measured from upstream or downstream pressure gauges as described above. The reactor pressure may be in a range of from greater than atmospheric pressure to 20 bar, from 2 bar to 20 bar, or from 5 bar to 20 bar. The conditions under which pyrolysis is carried out may also refer to a temperature of a cooling zone, e.g., the cooling zone 120 of the system 100, which may be, e.g., in a range of from 100° C. to 1300° C.

The present disclosure also provides processes for hydrocarbon pyrolysis. In embodiments, such a process comprises delivering a feed gas comprising a hydrocarbon to a reactor configured to contain a liquid metal within an interior chamber of the reactor under conditions to induce pyrolysis of the hydrocarbon in the liquid metal to form a product gas comprising $H_2$ and carbon. The feed gas is delivered at a linear gas velocity through the interior chamber such that the carbon is entrained into the product gas without accumulating the carbon in the interior chamber during pyrolysis. (The indication of carbon accumulation by pressure measurement has been described above.) Any of the linear gas velocities disclosed herein may be used. Any of the pyrolysis conditions disclosed herein may be used.

The hydrocarbon pyrolysis process may be carried out using any of the present systems. In embodiments, a process for hydrocarbon pyrolysis is carried out using system 100 (but any of the present systems may be used). Such a process may comprise delivering the feed gas 121 via the inlet 122 under conditions (see above) to induce pyrolysis of the hydrocarbon in the liquid metal 112 as the feed gas 121 moves upwardly through the liquid metal 112 to form the product gas 127; and delivering the product gas 127 to the separation assembly 132 via the outlet 130. The process may further comprise separating the carbon from other components of the product gas 127 in the separation assembly 132. In embodiments, the feed gas 121 is delivered at a linear gas velocity such that no carbon accumulates within the reactor 102. (The indication of carbon accumulation by pressure measurement has been described above.) Any of the linear gas velocities disclosed herein may be used. Any of the pyrolysis conditions disclosed herein may be used. In embodiments, the process further comprises adjusting one or more of the feed gas flow rate, reactor temperature, reactor pressure in order to maintain a desired linear gas velocity (so as to ensure no carbon accumulation) during pyrolysis. In embodiments, the process further comprises adjusting one or more of the feed gas flow rate, reactor temperature, reactor pressure in order to maintain no change in pressure at an upstream pressure gauge and no change in pressure at a downstream pressure gauge (so as to ensure no carbon accumulation) during pyrolysis. In embodiments, the process further comprises condensing vaporized liquid metal in the cooling zone 120 for its return to the liquid metal 112. In embodiments, the liquid metal 112 consists of zinc. In embodiments, the feed gas 121 comprises methane.

Referring back to the present systems, including system 100, any of the present systems may include a controller configured to control one or more components of the system. The controller may be integrated into the system as part of a single device or its functionality may be distributed across one or more devices that are connected to other system components directly or through a network that may be wired or wireless. A database, a data repository for the system, may also be included and operably coupled to the controller.

Such a controller may include an input interface, an output interface, a communication interface, a computer-readable medium, a processor, and an application. The controller may be a computer of any form factor including an electrical circuit board.

The input interface provides an interface for receiving information into the controller. Input interface may interface with various input technologies including, e.g., a keyboard, a display, a mouse, a keypad, etc. to allow a user to enter information into the controller or to make selections presented in a user interface displayed on the display. Input interface further may provide the electrical connections that provide connectivity between the controller and other components of the system.

The output interface provides an interface for outputting information from the controller. For example, output interface may interface with various output technologies including, e.g., the display or a printer for outputting information for review by the user. Output interface may further provide an interface for outputting information to other components of the system.

The communication interface provides an interface for receiving and transmitting data between devices using various protocols, transmission technologies, and media. Communication interface may support communication using various transmission media that may be wired or wireless. Data and messages may be transferred between the controller, the database, other components of the system and/or other external devices using communication interface.

The computer-readable medium is an electronic holding place or storage for information so that the information can be accessed by the processor of the controller. Computer-readable medium can include any type of random access memory (RAM), any type of read only memory (ROM), any type of flash memory, etc. such as magnetic storage devices, optical disks, smart cards, flash memory devices, etc.

The processor executes instructions. The instructions may be carried out by a special purpose computer, logic circuits, or hardware circuits. Thus, the processor may be implemented in hardware, firmware, or any combination of these methods and/or in combination with software. The term "execution" is the process of running an application or the carrying out of the operation called for by an instruction. The instructions may be written using one or more programming language, scripting language, assembly language, etc. Processor executes an instruction, meaning that it performs/controls the operations called for by that instruction. Processor operably couples with the input interface, with the output interface, with the computer-readable medium, and with the communication interface to receive, to send, and to process information. Processor may retrieve a set of instructions from a permanent memory device and copy the instructions in an executable form to a temporary memory device that is generally some form of RAM.

The application performs operations associated with controlling other components of the system. Some of these operations may include receiving and/or processing data, e.g., from a pressure gauge(s), a temperature sensor(s), a flow controller(s) being used during pyrolysis or user-inputted data, e.g., a selected linear gas velocity. Other of these operations may include calculating a linear gas velocity based on the data, and/or controlling components of the system (e.g., adjusting feed gas flow rate, reactor temperature, reactor pressure, combinations thereof) based on the received or processed data, or both. This may include adjusting one or more of the feed gas flow rate, reactor temperature, reactor pressure in order to maintain a calculated or user-inputted linear gas velocity (so as to ensure no carbon accumulation) during pyrolysis. This may include adjusting one or more of the feed gas flow rate, reactor temperature, reactor pressure in order to maintain no change in pressure at an upstream pressure gauge and no change in pressure at a downstream pressure gauge (so as to ensure no carbon accumulation) during pyrolysis. Some or all of the operations described in the present disclosure may be controlled by instructions embodied in the application. The operations may be implemented using hardware, firmware, software, or any combination of these methods. The application may be implemented in software (comprised of computer-readable and/or computer-executable instructions) stored in the computer-readable medium and accessible by the processer for execution of the instructions that embody the operations of application. The application may be written using one or more programming languages, assembly languages, scripting languages, etc.

It is noted that devices including the processor, the computer-readable medium operably coupled to the processor, the computer-readable medium having computer-readable instructions stored thereon that, when executed by the processor, cause the device to perform any of the operations described above (or various combinations thereof) are encompassed by the disclosure. The computer-readable medium is similarly encompassed.

Figure 5:
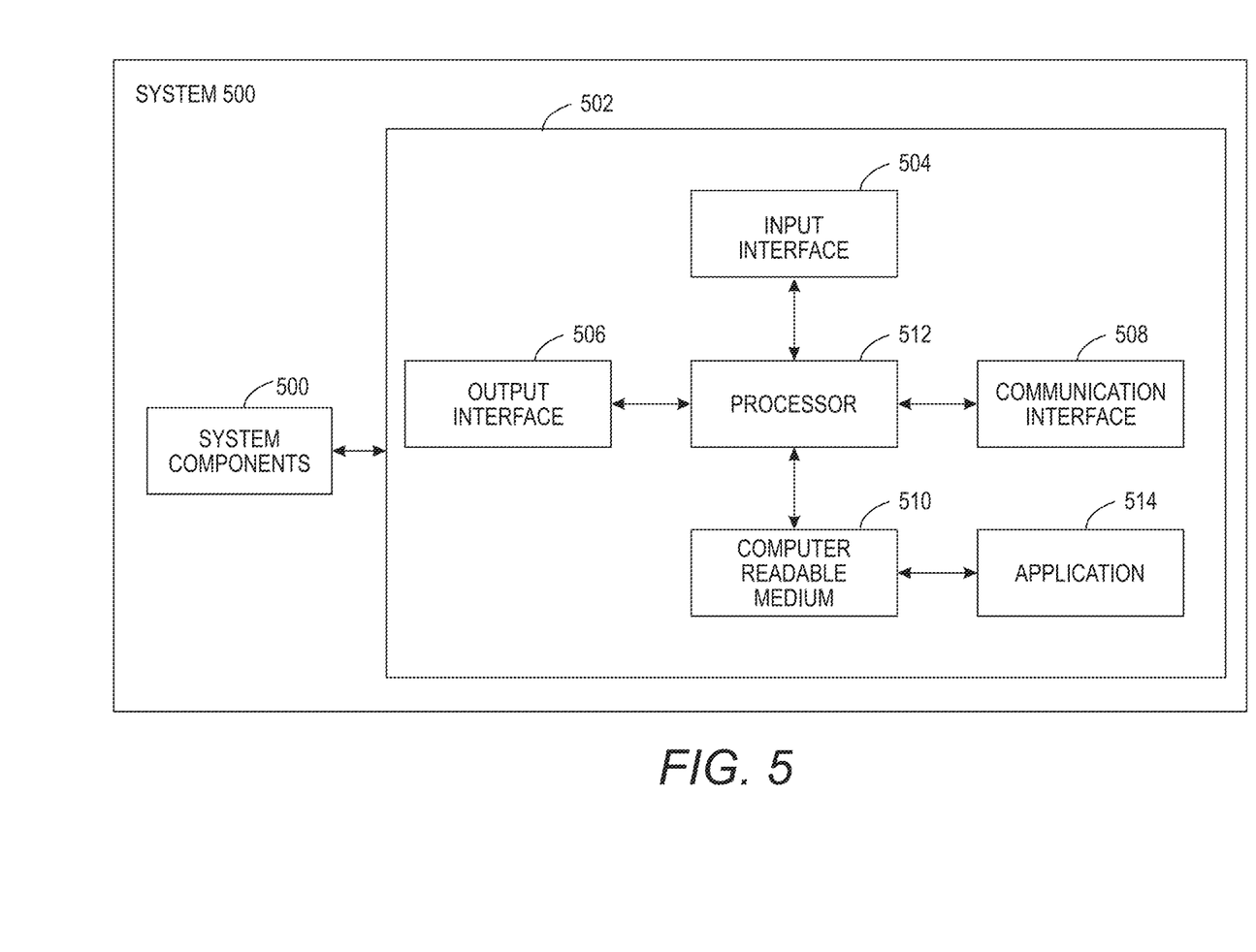
FIG. 5 shows a block diagram of a hydrocarbon pyrolysis system according to an illustrative embodiment, including an illustrative controller which may be used to control various components of the system.

A block diagram of another illustrative system 500 is shown in FIG. 5. The system 500 may be configured according to any of the disclosed systems, including system 100 of FIG. 1, comprising various components such as a reactor, a source of a liquid metal, a heater, a cooler, a gas delivery system comprising an inlet, an outlet, and a separation assembly. The system 500 further comprises a controller 502 for controlling operations of the system 500 and components thereof. As described above, such a controller 502 may include an input interface 504, an output interface 506, a communication interface 508, a computer-readable medium 510, a processor 512, and an application 514. The controller 502 and its components may each be configured as described above.

EXAMPLE

The following Example is being submitted to further define various species of the present disclosure. This Example is intended to be illustrative only and is not intended to limit the scope of the present disclosure. As used herein, "room temperature" refers to a temperature of from about 20° C. to about 25° C.

This Example demonstrates the concept of carbon product entrainment by high linear velocity of gas flow in a molten zinc bed reactor system. 200 grams of zinc shot (the source of molten zinc) was loaded in an alumina tube reactor (inner diameter 0.75 inch and outer diameter 1.0 inch), which had one end closed. The reactor was mounted inside an electric furnace and the furnace inside temperature was elevated to 1000° C., which converts the zinc shot to molten zinc. Gas (e.g., feed gas comprising methane) was fed to the reactor through an inlet tubing (quartz tubing, inner diameter of 0.16 inch and outer diameter of 0.24 inch) which reached to 0.5 inch above the bottom of the alumina tube reactor. Gas was fed through the inlet tubing at selected gas flow rates (sccm). The flowing gas generated gas bubbles that moved upwardly through the molten zinc bed. An outlet allowed for gas (e.g., product gas comprising $H_2$ and carbon) to flow out of the reactor. A back pressure regulator was mounted downstream of the reactor outlet for the reactor pressure elevation. The reactor pressure was elevated and a downstream pressure gauge positioned between the reactor outlet and the back pressure regulator measured 30 psig (which is 44.7 psia). An upstream pressure gauge was positioned near the inlet. Under a selected gas flow rate, readings from both upstream and downstream pressure gauges were taken to monitor for any increases in upstream pressure. An increase in upstream pressure indicates that carbon product has accumulated within the reactor, blocking gas passage through the molten zinc bed.

Figure 2:
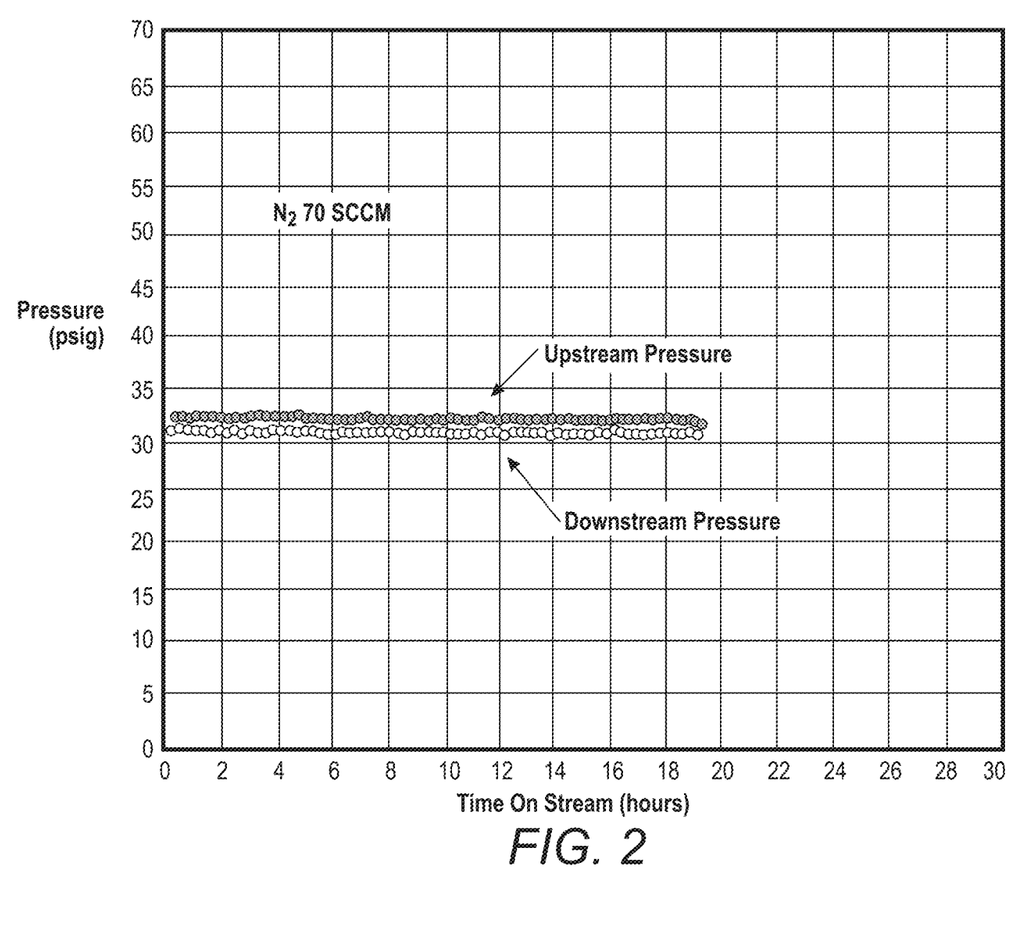
FIG. 2 shows a plot of upstream and downstream pressures in an alumina tube reactor filled with molten zinc while flowing nitrogen ($N_2$) through the reactor at a gas flow rate of 70 sccm.

First, nitrogen ($N_2$) gas was introduced into the reactor at a flow rate of 70 sccm. As noted above, the reactor downstream pressure gauge measured 30 psig. FIG. 2 shows a plot of the readings from the upstream and downstream pressure gauges in the reactor while flowing the $N_2$ at 70 sccm. As shown in FIG. 2, there was no change in reactor upstream pressure over a period of about 19 hours. This indicated no gas flow blockage was occurring within the reactor.

Figure 3:
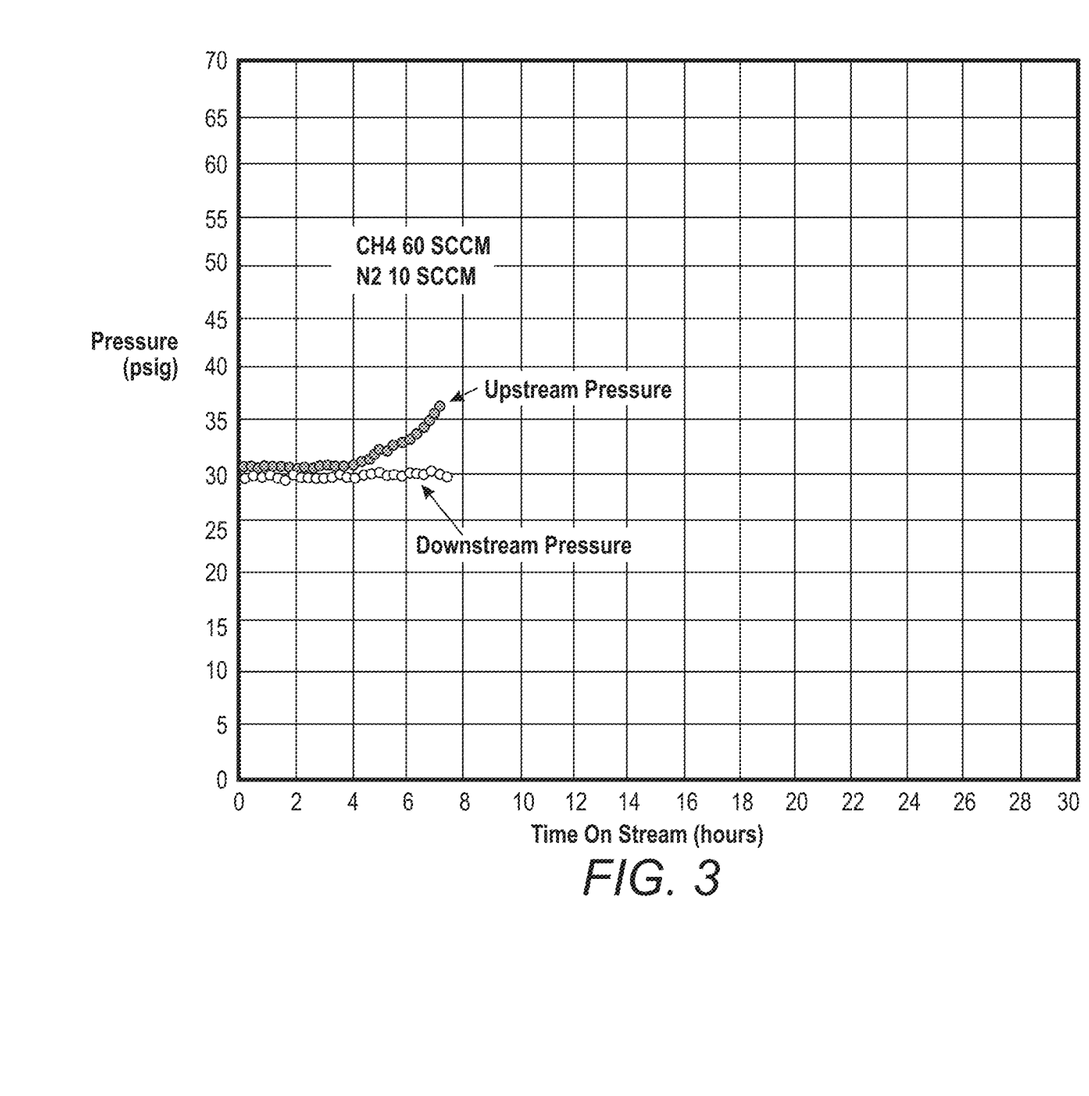
FIG. 3 shows a plot of upstream and downstream pressures in an alumina tube reactor filled with molten zinc while flowing methane (CH$_4$) and N$_2$ through the reactor at a gas flow rate of 70 sccm (60 sccm CH$_4$ and 10 sccm N$_2$). The upstream pressure starts to increase after about 4 hours, demonstrating the problem of carbon accumulation in the reactor.

Next, a feed gas containing both $CH_4$ (at 60 sccm) and $N_2$ (at 10 sccm) was introduced into the molten zinc bed through the inlet tubing. FIG. 3 shows a plot of the readings from the upstream and downstream pressure gauges in the reactor while flowing the feed gas. As shown in FIG. 3, upstream pressure started to rise after 4 hours of time-on-stream, reaching 37 psig after 7 hours time-on-stream before the experiment was stopped. The increase in upstream pressure was due to carbon product accumulating within the reactor and blocking gas passage through the molten zinc. This blockage makes gas passage increasingly difficult and leads to an increase in upstream pressure to maintain the selected gas flow rate of 70 sccm. The linear gas velocity (cm/s) of the reactor was calculated from Equation 1:

$$\frac{F(\text{cm}^3/s)}{A(\text{cm}^2)} * \left( \frac{T_{reactor}(K)}{P_{reactor}(psia)} * \frac{P_{standard}(psia)}{T_{standard}(K)} \right) \quad \text{(Equation 1)}$$

wherein F is the feed gas flow rate in cm$^3$/s (1.17 cm$^3$/s) at standard temperature and pressure, A is the reactor cross-sectional area (2.57 cm$^2$, calculated from the inner diameter of the alumina tube subtracting the outer diameter of the inlet tubing), $T_{reactor}$ is the reactor temperature (1273.15 K), $P_{reactor}$ is the reactor pressure (44.7 psia), $P_{standard}$ is standard pressure (14.7 psia), and $T_{standard}$ is standard temperature (273.15 K). Thus, under these conditions, the linear gas velocity of the reactor was about 0.70 cm/s.

Figure 4:
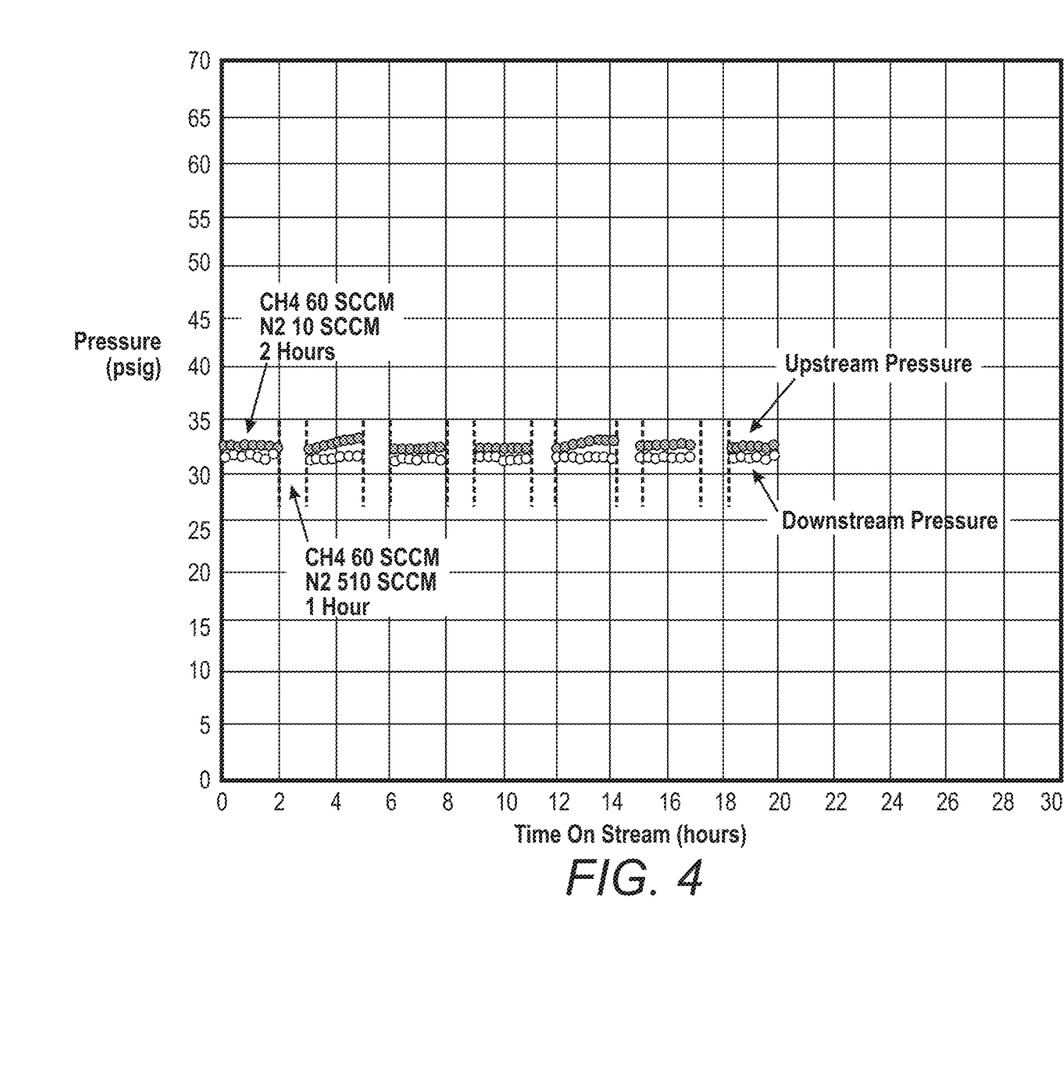
FIG. 4 shows a plot of upstream and downstream pressures in an alumina tube reactor filled with molten zinc while flowing CH$_4$ and N$_2$ through the reactor at a gas flow rate of 70 sccm (60 sccm CH$_4$ and 10 sccm N$_2$), but periodically increasing the flow of N$_2$ through the reactor to 510 sccm. This periodic increase in gas flow rate periodically increases the linear gas velocity in the reactor, demonstrating that linear gas velocity may be adjusted to prevent the accumulation of carbon within the reactor, including so that no carbon accumulates within the reactor.

Next, a feed gas containing both $CH_4$ and $N_2$ was introduced into the reactor through the inlet. In this case, however, the gas flow rate was 70 sccm (60 sccm $CH_4$ and 10 sccm $N_2$) while periodically (every two hours) increasing the flow of $N_2$ through the molten zinc bed to 510 sccm for one hour (total gas flow rate of 570 sccm). This periodic increase in gas flow rate periodically increased the linear gas velocity (calculated from Equation 1) in the reactor (from 0.70 cm/s to 5.67 cm/s). As shown in FIG. 4, during the 14 hours of methane pyrolysis (7 cyles of 2 hours methane pyrolysis), there was no increase in upstream pressure. Carbon product entrainment could also be visually observed from reactor outlet tubing. The results demonstrate that linear gas velocity may be adjusted to prevent the accumulation of carbon within the reactor, including so that no carbon accumulates within the reactor. Although carbon entrainment has been considered in some existing pyrolysis systems, it was unexpected that accumulation of carbon within the reactor could be completely prevented through adjustments of linear gas velocity.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

Any directional language used in the present disclosure such as top, bottom, upper, lower, above, below, and the like is not necessarily intended to be limiting, but rather to provide a point of reference to other elements being described.

As used herein, the term "mount" includes join, unite, connect, couple, associate, insert, hang, hold, affix, attach, fasten, bind, paste, secure, bolt, screw, rivet, solder, weld, glue, form over, form in, layer, mold, rest on, rest against, abut, and other like terms. The phrases "mounted on", "mounted to", and equivalent phrases indicate any interior or exterior portion of the element referenced. These phrases also encompass direct mounting (in which the referenced elements are in direct contact) and indirect mounting (in which the referenced elements are not in direct contact, but are connected through an intermediate element). The elements may be mounted permanently, removably, or releasably unless specified otherwise.

What is claimed is:

1. A system for hydrocarbon pyrolysis, the system comprising:
   a reactor configured to contain a liquid metal within an interior chamber of the reactor;
   a heater operably coupled to the reactor to form a heating zone within a first portion of the interior chamber comprising the liquid metal;
   a cooler operably coupled to the reactor to form a cooling zone within a second portion of the interior chamber above the first portion;
   a gas delivery assembly comprising an inlet in fluid communication with the interior chamber, the gas delivery assembly configured to deliver a feed gas comprising a hydrocarbon as a plurality of bubbles through the liquid metal;
   an outlet in fluid communication with the interior chamber and configured to deliver a product gas to a separation assembly, the product gas formed from pyrolysis of the hydrocarbon in the liquid metal, the product gas comprising $H_2$ and carbon; and the separation assembly in fluid communication with the interior chamber via the outlet, the separation assembly configured to separate the carbon from other components of the product gas, wherein the reactor is configured to entrain the carbon from pyrolysis of the hydrocarbon in the liquid metal into the product gas without accumulating the carbon in the interior chamber during pyrolysis; wherein the system comprises an upstream pressure gauge configured to measure a pressure of the feed gas during pyrolysis and a downstream pressure gauge configured to measure a pressure of the product gas during pyrolysis, and a controller comprising a processor and a non-transitory computer-readable medium operably coupled to the processor, the non-transitory computer-readable medium comprising instructions, that, when executed by the processor, cause the system to adjust one or more of a feed gas flow rate, a reactor temperature, and a reactor pressure to achieve no change in the pressure of the feed gas during pyrolysis and no change in the pressure of the product gas during pyrolysis.

2. The system of claim 1, further comprising a first recirculation path configured to return separated liquid metal from the separator assembly to the reactor.

3. The system of claim 1, wherein the reactor is configured to achieve a linear gas velocity of at least about 5 cm/s through the interior chamber at a feed gas flow rate of about 300 sccm or higher, a reactor temperature of about 1000° C., and a reactor pressure of about 147 psia.

4. The system of claim 1, wherein the system does not comprise any other outlet through which carbon exits the interior chamber other than the outlet configured to deliver the product gas to the separation assembly.

5. The system of claim 1, further comprising a controller comprising a processor and a non-transitory computer-readable medium operably coupled to the processor, the non-transitory computer-readable medium comprising instructions, that, when executed by the processor, cause the system to adjust one or more of a feed gas flow rate, a reactor temperature, and a reactor pressure to achieve a linear gas velocity of at least about 5 cm/s through the interior chamber.

6. The system of claim 1, wherein the system further comprises a carrier gas inlet in fluid communication with the interior chamber and configured to deliver a carrier gas to the cooling zone.

7. The system of claim 1, wherein the system does not comprise any other inlet through which a gas enters the reactor other than the inlet of the gas assembly.

8. The system of claim 1, further comprising a source of the liquid metal and the liquid metal consists of zinc.

9. The system of claim 1, further comprising a source of the feed gas.

10. The system of claim 9, wherein the feed gas comprises methane.

11. A system for hydrocarbon pyrolysis, the system comprising:

a reactor configured to contain a liquid metal within an interior chamber of the reactor;

a heater operably coupled to the reactor to form a heating zone within a first portion of the interior chamber comprising the liquid metal;

a cooler operably coupled to the reactor to form a cooling zone within a second portion of the interior chamber above the first portion;

a gas delivery assembly comprising an inlet in fluid communication with the interior chamber, the gas delivery assembly configured to deliver a feed gas comprising a hydrocarbon as a plurality of bubbles through the liquid metal;

an outlet in fluid communication with the interior chamber and configured to deliver a product gas to a separation assembly, the product gas formed from pyrolysis of the hydrocarbon in the liquid metal, the product gas comprising $H_2$ and carbon; and the separation assembly in fluid communication with the interior chamber via the outlet, the separation assembly configured to separate the carbon from other components of the product gas, wherein the system does not comprise any other outlet through which carbon exits the interior chamber other than the outlet configured to deliver the product gas to the separation assembly; wherein the system comprises an upstream pressure gauge configured to measure a pressure of the feed gas during pyrolysis and a downstream pressure gauge configured to measure a pressure of the product gas during pyrolysis and the system further comprises a controller comprising a processor and a non-transitory computer-readable medium operably coupled to the processor, the non-transitory computer-readable medium comprising instructions, that, when executed by the processor, cause the system to adjust one or more of a feed gas flow rate, a reactor temperature, and a reactor pressure to achieve no change in the pressure of the feed gas during pyrolysis and no change in the pressure of the product gas during pyrolysis.

12. The system of claim 11, wherein the reactor is configured to achieve a linear gas velocity of at least about 5 cm/s through the interior chamber at a feed gas flow rate of about 300 sccm or higher, a reactor temperature of about 1000° C., and a reactor pressure of about 147 psia.

13. The system of claim 11, further comprising a controller comprising a processor and a non-transitory computer-readable medium operably coupled to the processor, the non-transitory computer-readable medium comprising instructions, that, when executed by the processor, cause the system to adjust one or more of a feed gas flow rate, a reactor temperature, and a reactor pressure to achieve a linear gas velocity of at least about 5 cm/s through the interior chamber.

* * * * *